United States Patent [19]
Weisser

[11] Patent Number: 5,758,838
[45] Date of Patent: Jun. 2, 1998

[54] TAPE DRIVE

[75] Inventor: Fritz Weisser, St. Georgen, Germany

[73] Assignee: Deutsche Thomson Brandt GmbH, Villingen-Schwenningen, Germany

[21] Appl. No.: 733,512

[22] Filed: Oct. 18, 1996

[30] Foreign Application Priority Data

Nov. 16, 1995 [DE] Germany ............... 195 42 712.2

[51] Int. Cl.⁶ .................................................. G11B 15/44
[52] U.S. Cl. .................................................. 242/355.1
[58] Field of Search .................. 242/355, 355.1, 242/356.5, 256.7, 396.6, 396.8, 422.4; 360/74.1, 96.3, 96.4

[56] References Cited

U.S. PATENT DOCUMENTS 4,149,202  4/1979  Terada et al. ............... 242/355.1
4,635,146  1/1987  Koda et al. ................. 360/96.3
4,814,912  3/1989  Kleinlein et al. ............ 242/355.1
5,347,411  9/1994  Choi .......................... 242/355.1

FOREIGN PATENT DOCUMENTS 3606769  of 0000  Germany.

*Primary Examiner*—John P. Darling
*Attorney, Agent, or Firm*—Joseph S. Tripoli; Frederick A. Wein; Franscis A. Davenport

[57] ABSTRACT

A toothed lever 11, 12 which engages in a toothed rim 21 of an intermediate wheel 5 when the tape drive changes over from the winding mode to the stop state, a pivot 18 for the intermediate wheel 5 is formed at the point of engagement, over which pivot the toothed rim 21 of the intermediate wheel 5 rolls and passes from the previously engaged supply spool 1 or take-up spool 2 into a disengaged position. It is then necessary only for the spools 1, 2 themselves to be braked.

3 Claims, 3 Drawing Sheets

TAPE DRIVE

Tape drives are used in audio recorders, video recorders or data streamers. There are tape drives having separate motors for the spools and those having a common drive. In the case of tape drives which have a common drive, such as are used, for example, in video recorders, an intermediate wheel which is in engagement with a drive wheel is mounted on a pivotable intermediate lever. By pivoting the intermediate lever, the intermediate wheel can optionally be brought into engagement with a supply spool or a take-up spool or into a disengaged position. The intermediate wheel, the drive wheel and the spools have toothed rims which mesh in one another during engagement.

A brake device comprising pivotable brake levers with brake shoes which are placed against curved surfaces of the spools is used to brake the spools in the event of changing over from the winding mode to the stop state. The brake levers are actuated by a brake tensioning lever which is coupled to them.

In the case of known tape drives, after the changeover from the winding mode to the stop state, the intermediate wheel and the respectively driven spool either remain in engagement or the intermediate wheel is brought into a disengaged position due to pivoting of the intermediate lever by means of actuating the brake tensioning lever. In the first alternative, it is then necessary to brake the intermediate wheel and the drive wheel as well as the spools. On account of the mass inertia of these wheels, a high braking force is necessary, if a short braking time is to be achieved. The force expended for actuating the brake, the loading on the brake device and bearings and the wear are correspondingly high.

In the second alternative, although only the spools have to be braked once the intermediate wheel has been transferred to the disengaged position, the pivoting of the intermediate lever by the brake tensioning lever in this case requires a high force to be expended, since, during braking of the spools, a wedging action which is directed counter to the pivot moment to be applied is exerted on the intermediate lever. The wedging action is brought about since, when the brake tensioning lever is actuated, the brake levers with the brake shoes are simultaneously placed against the curved surfaces of the spools and the latter are braked, while the intermediate wheel with the drive wheel would like to maintain the previous rotational speed on account of the mass inertia. The intermediate wheel is supported by its toothed rim on the spool and, via its axle, introduces a pivot moment which is directed at the spool into the intermediate lever, that is to say reinforces the engagement of the intermediate wheel with the spool.

The invention is based on the object of providing a tape drive which, in the event of changing over from the winding mode to the stop state, enables a short braking time accompanied by a smaller braking force and less wear.

This object is achieved, in the case of a tape drive according to the preamble of claim 1, by means of the features specified in the characterizing clause. Developments and advantageous refinements emerge from the subclaims.

In the solution according to the invention, a toothed lever is actuated by the brake tensioning lever, which lever engages in the toothed rim of the intermediate wheel. The point of engagement forms a pivot for the intermediate wheel, over which pivot the toothed rim rolls. In this case, a pivot moment is introduced, via the bearing of the intermediate wheel, into the intermediate lever, which pivot moment is directed away from the spool and thereby decouples the intermediate wheel from the spool and brings it into the disengaged position. The forces exerted here on the toothed lever are directed transversely with respect to its actuation direction and therefore do not influence the actuation forces. After the intermediate lever has been pivoted out, the intermediate wheel is also disengaged from the toothed lever, with the result that it can freely coast to a stop with the drive wheel, in other words is not abruptly brought to a standstill by the toothed lever, for instance. The brakes now act exclusively on the spools.

A development provides that the toothed levers are designed as an extension of the respective brake levers. This embodiment not only has the advantage of a low mechanical outlay, rather it also enables the transverse forces exerted on the toothed lever by the intermediate wheel to be utilized for increasing the bearing force of the brake shoe against the curved surface of the previously driven spool. The braking force is consequently briefly reinforced and the braking time is reduced further.

Preferably, the intermediate wheel has a curved surface and the toothed levers carry lugs, one of which, after the rolling of the toothed rim of the intermediate wheel, assumes a position which blocks a return of the intermediate wheel into the engaged position with the previously engaged supply spool or take-up spool by bearing against the curved surface of the intermediate wheel.

In the event of possible swinging movements of the intermediate lever, the intermediate wheel can then come into engagement neither with the toothed lever nor with the spool, as long as the drive is in the stop state. Any risk of damage to the toothed rims is thus precluded.

A tape drive having the features according to the invention is explained below with reference to the drawings, in which.

Figure 1:
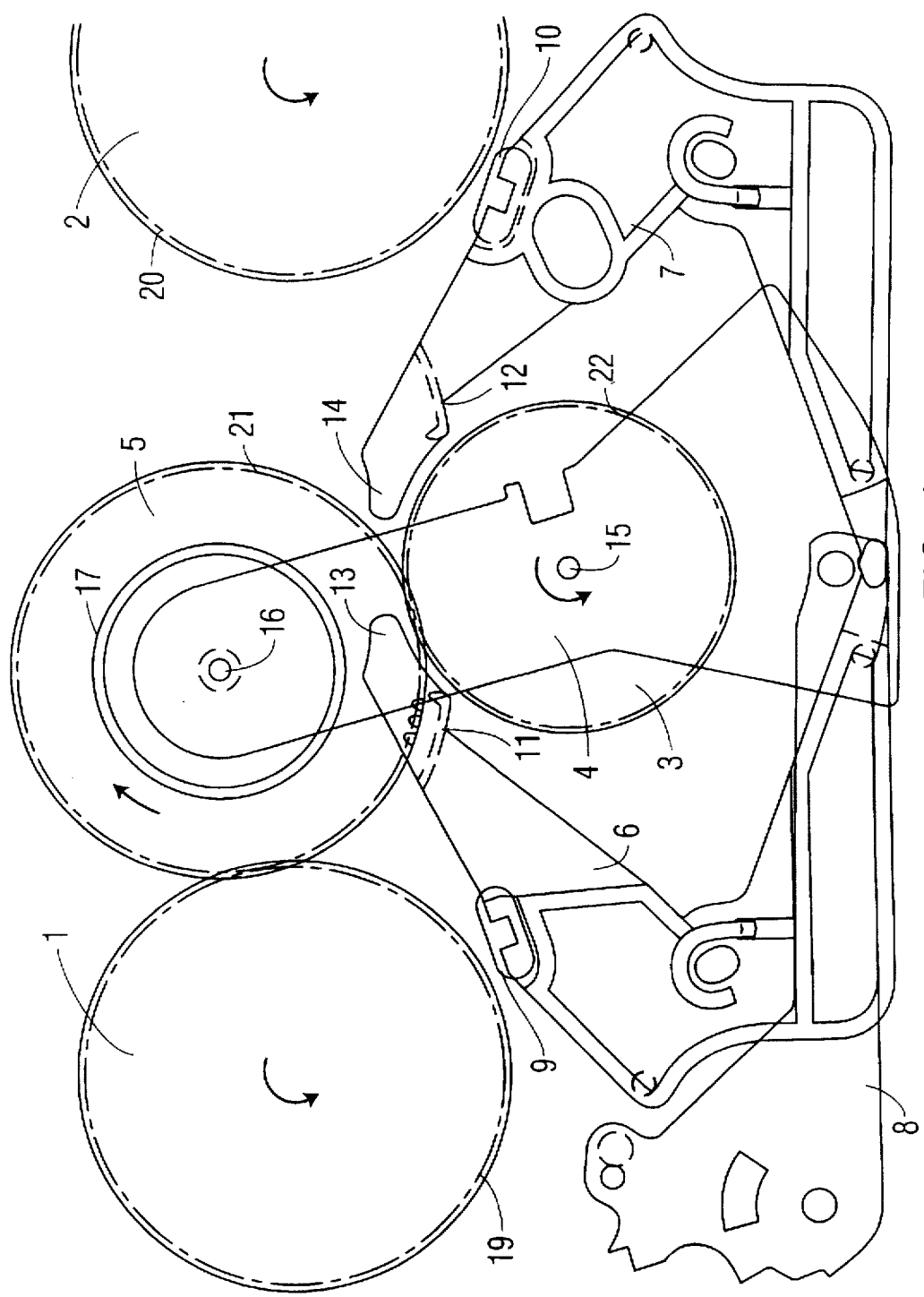
FIG. 1 shows a tape drive in the winding mode.

The tape drive illustrated in the drawing comprises a supply spool 1, a take-up spool 2, a winding drive having a drive wheel 3 and an intermediate wheel 5 which is in engagement and mounted with the drive wheel 3 on a pivotable intermediate lever 4, as well as a brake device comprising pivotable brake levers, 6, 7 with brake shoes 9, 10 for braking the supply spool 1 and the take-up spool 2, and a brake tensioning lever 8 coupled to the brake levers 6, 7. The supply spool 1, the take-up spool 2, the intermediate wheel 5 and the drive wheel 3 are provided with toothed rims 19, 20, 21, 22. By pivoting the intermediate lever 4 about the axle 15 of the drive wheel 3, the intermediate wheel 5 can optionally be brought into engagement with the supply spool 1 or the take-up spool 2 or into a disengaged position. Coupled to the brake tensioning lever 8 is a respective toothed lever 11, 12, which is designed as an extension of the respective brake lever 6, 7 in the exemplary embodiment. Furthermore, the toothed levers 11, 12 or the extensions of the brake levers 6, 7 are provided with lugs 13, 14 and the intermediate wheel 5 has a curved surface 17 which is placed against one of the lugs 13, 14 in certain operating states, thereby blocking the intermediate lever 4 from pivoting back.

FIG. 1 shows the tape drive in the winding mode, to be precise during rewinding. The direction of rotation is indicated by arrows. The brake tensioning lever 8 and the brake levers 6, 7 are pivoted out. The intermediate lever 4 is pivoted with the intermediate wheel 5 towards the supply spool 1, and the intermediate wheel 5 is in engagement via its toothed rim 21 with the toothed rim 19 of the supply spool 1. This position of the intermediate lever 4 is effected automatically in that the drive starts up with the drive wheel 3 and the mass inertia force of the intermediate wheel 5 to be accelerated exerts a counterforce on its drive axle 16, which counterforce introduces a corresponding pivot moment into the intermediate lever 4. Mass inertia forces and tape transport forces of the driven supply spool 1 have the effect that the intermediate wheel 5 is supported by its toothed rim 21 on the toothed rim 19 of the supply spool 1 and at the same time introduces, via its axle 16, a pivot moment into the intermediate lever 4, which pivot moment is directed at the supply spool 1, that is to say reinforces the engagement of the intermediate wheel 5 with the supply spool 1.

Figure 2:
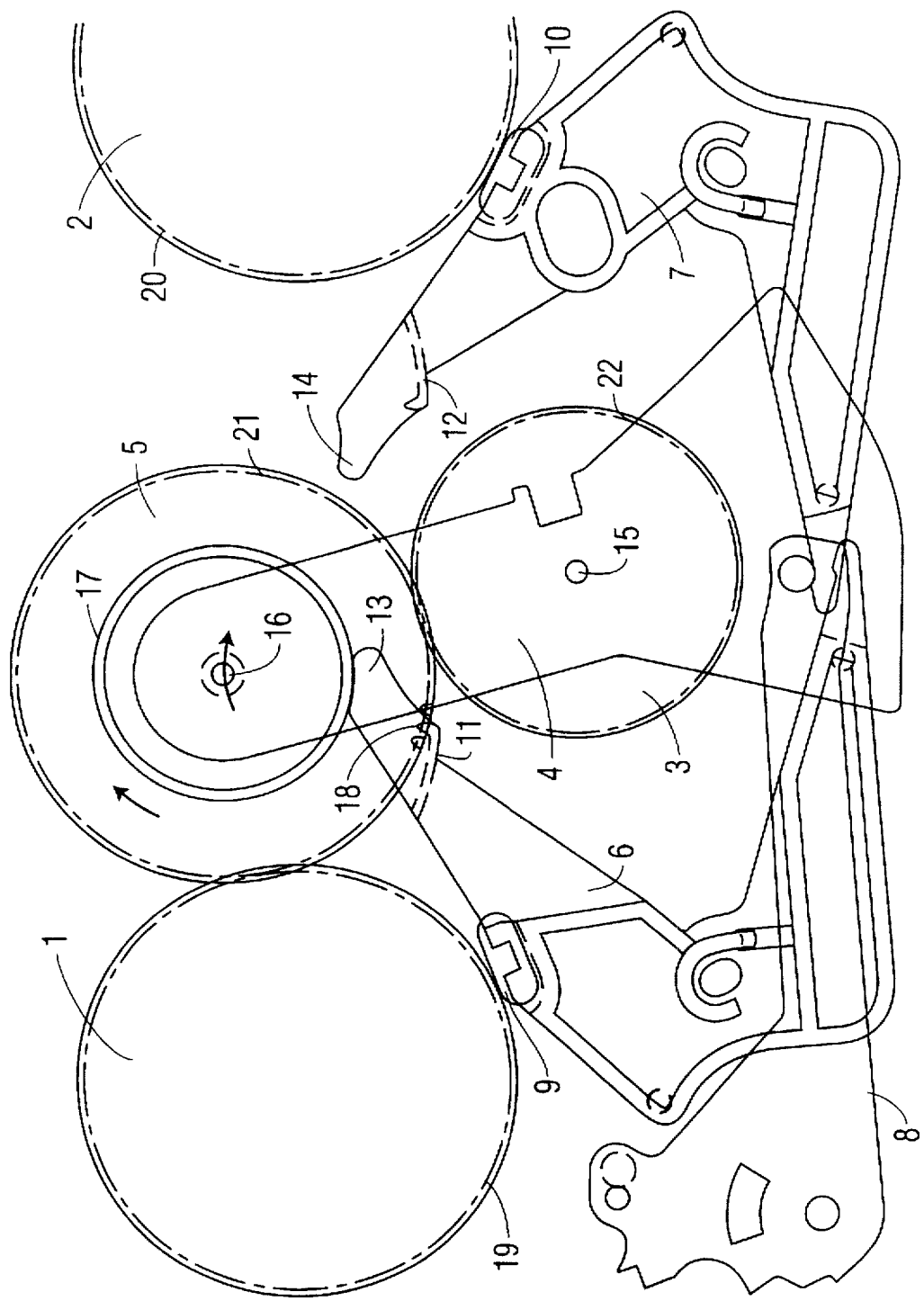
FIG. 2 shows the tape drive directly after changing over from the winding mode to the stop state.

FIG. 2 shows the tape drive directly after the changeover from the winding mode to the stop state. The brake tensioning lever 8 and the brake levers 6, 7 are pivoted in. The right-hand brake shoe 10 bears fully against the curved surface of the take-up spool 2, while the left-hand brake shoe 9 bears partially against the curved surface of the supply spool 1. At the same time, the left-hand toothed lever 11 engages in the toothed rim 21 of the intermediate wheel 5. By turning the intermediate wheel 5 further, the toothed rim 21 of the latter rolls on the toothed lever 11 about the pivot 18. At the same time, the intermediate lever 4 pivots to the right and the intermediate wheel 5 is disengaged from the supply spool 1. As a result of the reaction force which is directed transversely at the toothed lever 11 and thus also at the brake lever 6, the left-hand brake shoe 9 is now pressed more strongly against the curved surface of the supply spool 1 and brakes the latter.

Figure 3:
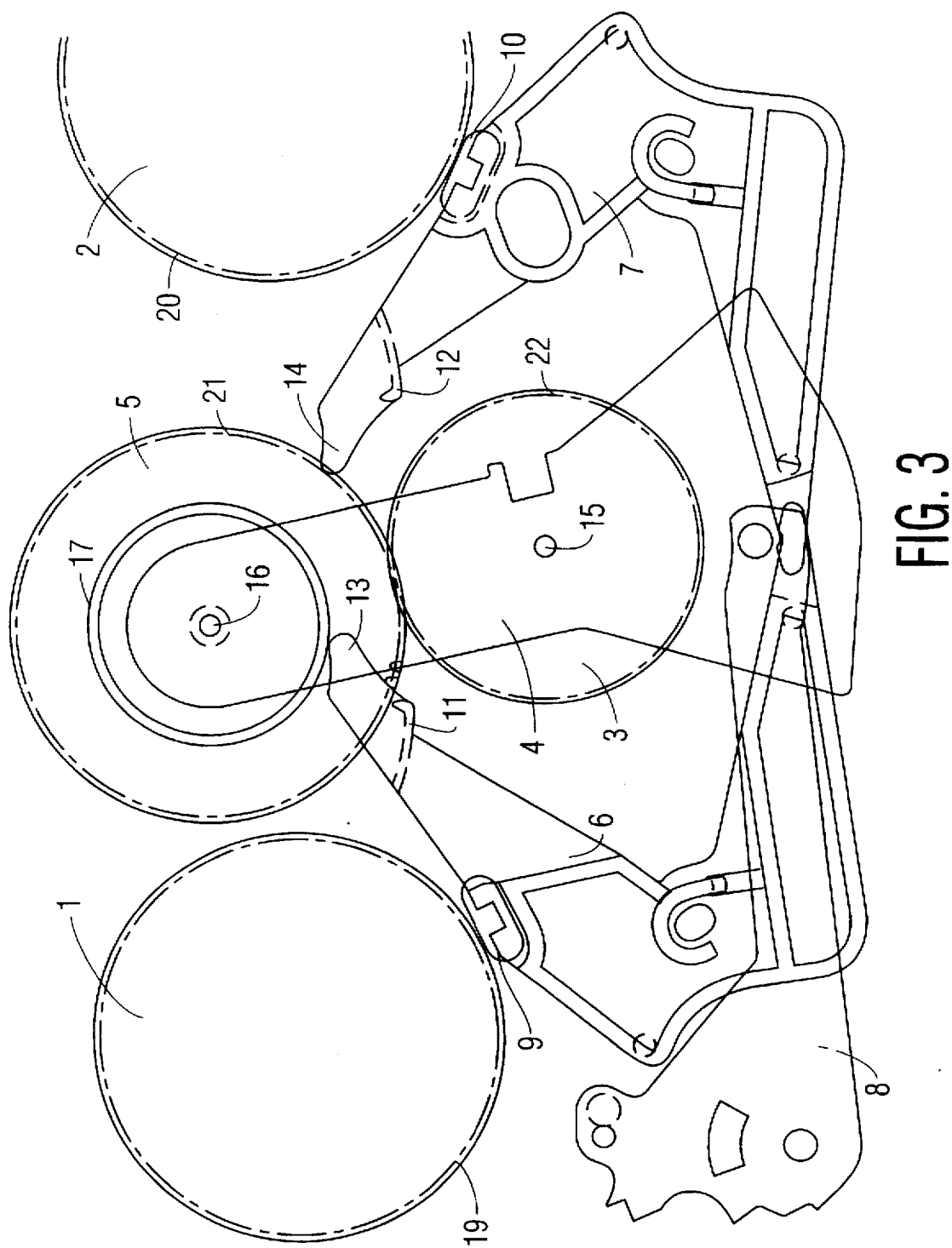
FIG. 3 shows the tape drive in the stop state.

By virtue of the fact that the intermediate lever 4 subsequently pivots further to the right, the toothed rim 21 of the intermediate wheel 5 is also disengaged from the left-hand toothed lever 11. The brake lever 6 with the toothed lever 11 and the lug 13 can now advance slightly further. The lug 13 finally passes in this way into a position in which it blocks a return of the intermediate wheel 5 into the engaged position with the previously engaged supply spool 1 by bearing against the curved surface 17 of the intermediate wheel 5. FIG. 3 shows the stop state, in which the intermediate lever 4 with the intermediate wheel 5 is in a disengaged position and the brake shoes 9, 10 bear fully against the curved surfaces of the spools 1, 2.

The intermediate wheel 5 can be engaged with one of the spools 1, 2 again only after the brake has been released by pivoting out the brake tensioning lever 8 and the brake levers 6, 7. The illustration referring to the rewinding mode applies analogously to the forward winding mode. In this case, the intermediate lever 4 is situated in the right-hand position and the intermediate wheel 5 is in engagement with the take-up spool 2. In the event of changing over from the winding mode to the stop state, the right-hand toothed lever 12 is then engaged with the toothed rim 21 of the intermediate wheel 5.

I claim:

1. Tape drive, comprising a supply spool (1), a take-up spool (2), a winding drive having a drive wheel (3) and an intermediate wheel (5) which is in engagement and mounted with the drive wheel (3) on a pivotable intermediate lever (4), is provided with a toothed rim (21) and, by pivoting the intermediate lever (4), can optionally be brought into engagement with the supply spool (1) or the take-up spool (2) or into a disengaged position, and further comprising a brake device comprising pivotable brake levers (6, 7) with brake shoes (9, 10) for braking the supply spool (1) and the take-up spool (2), and also a brake tensioning lever (8) coupled to the brake levers (6, 7), characterized in that toothed levers (11, 12) are coupled to the brake tensioning lever (8), one of which toothed levers, when the tape drive changes over from the winding mode to the stop state, engages in the toothed rim (21) of the intermediate wheel (5) and, at the point of engagement, forms a pivot (18) for the intermediate wheel (5), over which pivot the toothed rim (21) of the intermediate wheel (5) rolls and passes from the previously engaged supply spool (1) or take-up spool (2) into the disengaged position.

2. Tape drive according to claim 1, characterized in that the toothed levers (11, 12) are designed as an extension of the respective brake levers (6, 7).

3. Tape drive according to claim 1 or 2, characterized in that the intermediate wheel (5) has a curved surface (17) and the toothed levers (11, 12) are provided with lugs (13, 14), one of which, after the rolling of the toothed rim (21) of the intermediate wheel (5), assumes a position which blocks a return of the intermediate wheel (5) into the engaged position with the previously engaged supply spool (1) or take-out spool (2) by bearing against the curved surface (17) of the intermediate wheel (5).

\* \* \* \* \*